April 3, 1951  G. A. LYON  2,547,033
WHEEL COVER
Filed March 14, 1946
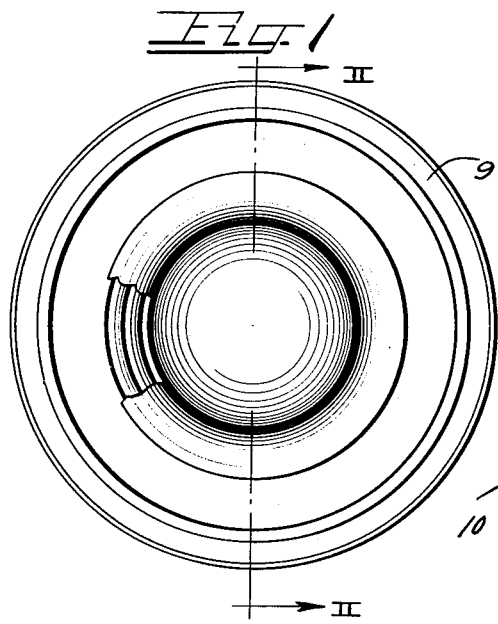
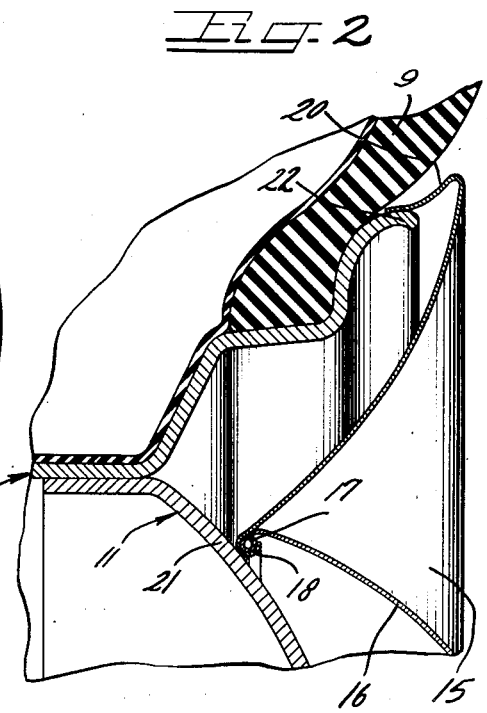
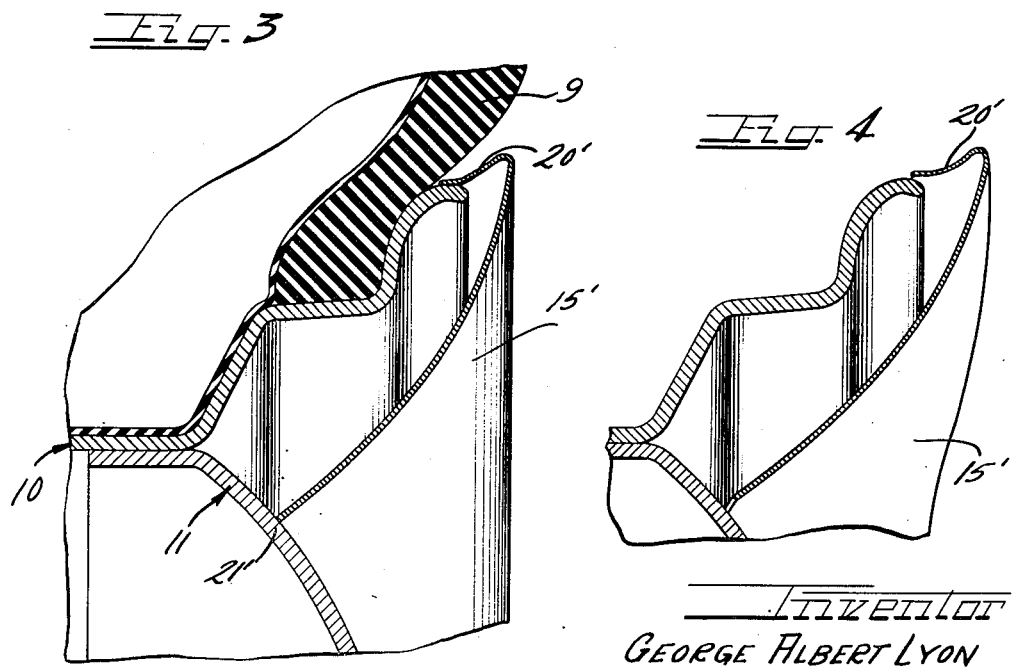
Inventor
GEORGE ALBERT LYON
By The Firm of Charles W. Hills Attys.

Patented Apr. 3, 1951

2,547,033

UNITED STATES PATENT OFFICE 2,547,033

WHEEL COVER

George Albert Lyon, Allenhurst, N. J.

Application March 14, 1946, Serial No. 654,286

4 Claims. (Cl. 301—37)

1

This invention relates to an automobile wheel cover and more particularly to a metal cover which can be resiliently snapped over an edge of a tire rim in close proximity to an outer side wall of the tire.

An object of this invention is to provide a simple metallic wheel cover for disposition over at least the side flanges of an automobile tire rim, and which is so formed at its outer marginal portion that that portion can be resiliently snapped over an outer edge of the rim part for detachably retaining the cover in position on the wheel and without requiring the use of any additional retaining means.

Another object of this invention is to provide an automobile wheel cover which lends itself to economical manufacture on a large production basis from sheet steel.

In accordance with the general features of this invention, there is provided in a cover structure for a wheel including multi-flanged tire rim and body parts, a circular sheet metal cover including an annular portion for disposition over side flanges of the rim part and extending radially and axially inwardly from an outer edge of the rim part to a point over the body part, the outer margin of the cover portion extending radially beyond said outer edge of the rim part and being turned back upon itself to form a resilient snap-on flange for detachable cover retaining and nested engagement with the rim edge.

Still another feature of the invention relates to the formation of the cover so that it may be used either as an annular cover ring or can be readily fastened to a central hub cap simulating portion.

Other objects and features of this invention will more fully appear from the following detailed description taken in connection with the accompanying drawings, which illustrate several embodiments thereof and in which:

Figure 1 is a side view of a wheel structure having a cover embodying the features of this invention; a portion of the cover being broken away to show the tire rim therebehind;

Figure 2 is an enlarged fragmentary cross-sectional view taken on substantially the line II—II of Figure 1 looking in the direction indicated by the arrows;

Figure 3 is a fragmentary sectional view similar to Figure 2 but showing the cover in the form of a ring without a hub cap simulating portion attached to the ring;

Figure 4 is a cross-sectional view similar to Figure 3 but illustrating how the cover ring is snapped over an outer edge of the tire rim part.

As shown on the drawing:

The reference character 9 designates generally a pneumatic tire and tube assembly which is of conventional construction and is supported upon a conventional multi-flanged drop center type of tire rim 10. This tire rim is carried in the usual way by a load bearing or body part 11.

Cooperable with the parts of this wheel is a cover embodying the features of this invention, which includes an outer annular ring portion 15 and a central hub cap simulating portion 16. The outer ring 15 is lock-seamed to the central portion 16. More specifically the central portion 16 has a rolled edge 17 which is nested inside of a turned or rolled edge 18 on the cover portion 15.

This cover may be made from any suitable material although I contemplate making it from sheet steel. The two portions 15 and 16 thereof may be suitably blanked in a standard press and may then be lock-seamed together in the manner shown. It is of course clear that the two portions could be attached together in a different manner without deviating from the features of this invention inasmuch as the invention is not specifically concerned with the type of connection between the two portions.

As a matter of fact, as shown in Figures 3 and 4, the ring portion 15 could be used as a cover in itself without any central hub cap portion and still embrace the features of this invention.

The outer marginal portion of the cover part 15 is turned back upon itself so as to form a concealed annular resilient flange 20 adapted to be resiliently cammed and snapped over the curved outer edge 22 of the rim part 10.

It will be appreciated that the curvature of the rim edge 22 lends itself to a simple camming of the flange 20 of the cover over the edge and into close proximity with the outer side wall of the tire.

In the application of the cover, it is first placed over the outer side of the wheel with its flange 20 opposite the edge 22 and then the cover is pressed axially home until the inner edge of the ring portion 15 contacts the body part 11 at 21. When in this position the cover is tightly held in engagement with two parts of the wheel and effectively conceals the stepped flanges of the rim part 10.

The cover may be easily removed from the wheel by inserting the end of a pry off tool, such as the end of screw driver, under the flange 20 and forcibly ejecting the cover from the wheel. In other words, the end of a screw driver is inserted between the flange 20 and the side wall of the tire and then by a simple twisting action the flange is forcibly cammed off of the curved edge 22 of the tire rim part 10.

In the second embodiment of the invention, as shown in Figures 3 and 4, the cover portion 15' is substantially identical to the cover portion 15 with the exception that it does not have its inner edge rolled around and connected to a hub cap simulating part, such as the part 16. Instead the inner edge of the cover portion 15' is adapted to bear at 21' on the body part.

The outer margin of this annular cover portion 15' is formed with an underturned goose-neck flange 20' which corresponds in structure and function to the flange 20 previously described.

In both forms of the invention, the annular cover portion is of a bowed or convex cross-sectional contour and extends radially and axially inwardly from a point adjacent the outer side wall of the tire to a point 21—21' directly over the body part. By reason of the curvature of this portion together with its radial extent, the tire is given the appearance of being much larger than is actually the case. In other words, the annular cover portion gives the illusion of being a part of the side wall of the tire. This appearance can be accentuated if the cover portion has a white external finish in which event it will appear to constitute a white side wall part of the tire. That is to say, it gives the wheel assembly the appearance of having a white side wall tire in which the tire extends clear down to the body part of the wheel.

I claim as my invention:

1. In a wheel structure including a multi-flange tire rim and a body part, the tire rim being adapted to support a pneumatic tire and having an outer terminal flange extending axially outwardly beyond the tire, a circular wheel cover made from sheet material and having a radial extent to engage the wheel body and to extend radially outwardly beyond the tire rim terminal flange, the outer margin of said cover having an axially and radially inwardly turned attachment flange formation including a terminal portion engaging said tire rim terminal flange at the radially outer side thereof in that portion thereof which is clear of the tire, said terminal marginal flange portion of the cover being resiliently attachable to the tire rim terminal flange in snap-on pry-off relationship while the tire is on the rim, the engagement of the inner portion of the cover with the wheel body affording a cooperative relationship with said terminal flange maintaining the same under stress against said tire rim terminal flange.

2. In a cover structure for a wheel including multi-flanged tire rim and body parts wherein the tire rim has an outer terminal flange extending beyond a tire carried by the tire rim, a circular cover body having a radial extent to conceal the tire rim and engageable at its radially inner portion with the wheel body, the outer margin of the wheel cover body having a resilient generally axially and radially turned continuous attachment flange formation of generally goose-neck cross sectional shape and of an extent to engage the radially outer side of the tire rim terminal flange resiliently clear of the tire, the terminal portion of said outer marginal flange formation defining at its terminus a diameter only slightly less than the diameter defined by the terminus of the tire rim terminal flange so as to be attachable in snap-on relation and detachable by means of a pry-off tool operating against the adjacent side wall of the tire.

3. In a cover structure for a wheel including multi-flanged tire rim and body parts wherein the tire rim has an outer terminal flange extending beyond a tire carried by the tire rim, a circular cover body having a radial extent to conceal the tire rim and engageable at its radially inner portion with the wheel body, the outer margin of the wheel cover body having a resilient generally axially and radially turned continuous attachment flange formation of generally goose-neck cross sectional shape and of an extent to engage the radially outer side of the tire rim terminal flange resiliently clear of the tire, the terminal portion of said outer marginal flange formation defining at its terminus a diameter only slightly less than the diameter defined by the terminus of the tire rim terminal flange so as to be attachable in snap-on relation and detachable by means of a pry-off tool operating against the adjacent side wall of the tire, the cover body being in the form of an annulus and having the inner edge arranged to abut the wheel body edgewise to delimit the axially inward movement of said outer marginal flange formation where it engages the tire rim terminal flange.

4. In a cover structure for a wheel including multi-flanged tire rim and body parts wherein the tire rim has an outer terminal flange extending beyond a tire carried by the tire rim, a circular cover body having a radial extent to conceal the tire rim and engageable at its radially inner portion with the wheel body, the outer margin of the wheel cover body having a resilient generally axially and radially turned attachment flange formation of generally goose-neck cross sectional shape and of an extent to engage the radially outer side of the tire rim terminal flange resiliently clear of the tire, the terminal portion of said outer marginal flange formation defining at its terminus a diameter only slightly less than the diameter defined by the terminus of the tire rim terminal flange so as to be attachable in snap-on relation and detachable by means of a pry-off tool operating against the adjacent side wall of the tire, the inner margin of the cover body being turned outwardly, and a hub cap member having a peripheral margin engaged by the turned inner margin of the said cover body to form a unitary cover assembly.

GEORGE ALBERT LYON.

REFERENCES CITED

The following references are of record in the file of this patent:

UNITED STATES PATENTS

| Number | Name | Date |
| --- | --- | --- |
| 1,948,237 | Milner | Feb. 20, 1934 |
| 2,317,393 | Lyon | Apr. 27, 1943 |
| 2,386,240 | Lyon | Oct. 9, 1945 |